UNITED STATES PATENT OFFICE.

MAX HAMEL, OF GRÜNAU, NEAR BERLIN, GERMANY.

PROCESS OF MAKING TANNING EXTRACTS.

1,098,348. Specification of Letters Patent. Patented May 26, 1914.

No Drawing. Application filed July 13, 1909. Serial No. 507,414.

*To all whom it may concern:*

Be it known that I, MAX HAMEL, a subject of the King of Prussia, residing at 1 Wilhelmstrasse, Grünau, near Berlin, Germany, have invented certain new and useful Improvements in Processes of Making Tanning Extracts; and I do hereby declare the following to be a full, clear, and exact description of the invention.

The subject-matter of my invention is an improved process of manufacturing extracts of tannin and tanning matter.

The extracts of tanning matter used in leather-dressing and dyeing works are for the most part obtained by extracting the materials containing tannin by means of water; these aqueous extracts are used partially directly as solutions and partially in solid form. The aqueous extracts have the disadvantage that they very readily decompose, a portion of the tannin contained in them being decomposed. This decomposition takes place even during the lixiviation of the materials containing tannin and during the evaporation for the purpose of obtaining concentrated or solid extracts. The loss of tannin is very considerable, and besides the color of the extract also suffers. It has not been possible heretofore to prevent such decomposition even by adding preserving agents, and the product obtained is not only less valuable owing to the smaller percentage of tannin but in many cases scarcely able to be employed. Now I have found that such decomposition of the extract can be prevented if the materials containing tannin are exposed to a somewhat higher temperature without introducing moisture or water into said materials *i. e.* without increasing the moisture perhaps contained therein by the heating means before lixiviation. For example, whereas it is not otherwise possible to extract myrobalans with water without losing about 20% of tannin, the extract obtained yielding, when dissolved, quite a turbid solution which decomposes still further when heated; the same material after having been previously raised for some time to a somewhat higher temperature, say exceeding 40° C., can be lixiviated with water without the least decomposition of the tannin being caused. The heating of the materials to be treated before lixiviation may be performed in any suitable manner. The dry extract made from such extracts is almost clearly soluble and has the same percentage of tannin as an extract which is made by extracting substances containing tannin with 80% alcohol. It has moreover the advantage that its solutions remain undecomposed when heating, whereas the extract obtained with 80% alcohol after being dissolved again in water decomposes when heated just like the preparation obtained according to the ordinary method with water. The same favorable action is obtained by the process when employing other raw materials than myrobalans containing tanning matter, as, *e. g.*, galls, dividivi, algarobilla, quebracho, catechu, valonia, and so on. In this manner it is possible, for example, to obtain from galls a tannin lye technically free from gallic acid which even after standing for a somewhat long time and when evaporated shows no formation of gallic acid and which is purer in this respect than that obtained heretofore with alcohol. The process is therefore of great technical value.

I claim:

1. The herein described process of manufacturing inherently stable aqueous tannin extracts and tannin, which consists in exposing the raw tanniniferous material to a temperature exceeding 40° C. and in the absence of extraneous moisture, for a period of sufficient duration to nullify subsequent decomposing bacterial action on the tannin and subsequently lixiviating the thus treated material with water to secure an aqueous extract.

2. In the process of obtaining inherently stable tannin extracts from tanniniferous materials, the preliminary step before lixiviation, which consists in subjecting the raw material to dry heat and in the absence of extraneous moisture, for a period of sufficient duration to nullify subsequent decomposing bacterial action on the tannin.

3. As a new product, an aqueous tannin extract obtained from tanniniferous material including myrobalans, said extract being inherently stable in both concentrated and dilute solution and even under moderate heat, substantially as described.

4. As a new product, an aqueous tannin extract substantially free from decomposing acids, obtained from tanniniferous material including myrobalans, said extract being inherently stable in both concentrated and dilute solution and even under moderate heat, substantially as described.

In testimony that I claim the foregoing as my invention, I have signed my name in presence of two subscribing witnesses.

MAX HAMEL.

Witnesses:
JOHANNES HEIN,
HENRY HASPER.

Copies of this patent may be obtained for five cents each, by addressing the "Commissioner of Patents, Washington, D. C."